(12) United States Patent
Kurumado

(10) Patent No.: US 8,018,224 B2
(45) Date of Patent: Sep. 13, 2011

(54) ROTATION DETECTION SENSOR

(75) Inventor: Norihiro Kurumado, Nagoya (JP)

(73) Assignee: DENSO CORPORATION, Kariya (JP)

( * ) Notice: Subject to any disclaimer, the term of this patent is extended or adjusted under 35 U.S.C. 154(b) by 428 days.

(21) Appl. No.: 12/230,211

(22) Filed: Aug. 26, 2008

(65) Prior Publication Data
US 2009/0058404 A1 Mar. 5, 2009

(30) Foreign Application Priority Data
Aug. 30, 2007 (JP) ................................. 2007-223361

(51) Int. Cl.
*G01B 7/30* (2006.01)
(52) U.S. Cl. .................................. 324/207.25
(58) Field of Classification Search .................. None
See application file for complete search history.

(56) References Cited

U.S. PATENT DOCUMENTS

| | | | |
|---|---|---|---|
| 4,594,548 A | 6/1986 | Takahashi et al. | |
| 6,452,381 B1* | 9/2002 | Nakatani et al. | 324/207.21 |
| 6,924,639 B2* | 8/2005 | Uenoyama | 324/207.21 |
| 7,078,892 B2* | 7/2006 | Kurumado | 324/207.21 |
| 7,307,417 B2* | 12/2007 | Tokuhara et al. | 324/207.25 |
| 7,355,388 B2* | 4/2008 | Ishio | 324/207.21 |
| 7,918,962 B2* | 4/2011 | Okui et al. | 250/453.11 |
| 2001/0002791 A1* | 6/2001 | Tsuge et al. | 324/174 |
| 2005/0194964 A1* | 9/2005 | Okada et al. | 324/165 |
| 2006/0028203 A1* | 2/2006 | Kawashima et al. | 324/207.25 |
| 2006/0082364 A1 | 4/2006 | Kurumado | |
| 2006/0170419 A1* | 8/2006 | Shimomura et al. | 324/207.25 |
| 2007/0139036 A1* | 6/2007 | Kondo | 324/179 |
| 2007/0247144 A1* | 10/2007 | Tokuhara et al. | 324/207.25 |
| 2008/0048651 A1* | 2/2008 | Matsumoto et al. | 324/207.2 |
| 2010/0225308 A1* | 9/2010 | Kurumado et al. | 324/207.25 |

FOREIGN PATENT DOCUMENTS

| | | |
|---|---|---|
| JP | A-5-288573 | 11/1993 |
| JP | A-11-132790 | 5/1999 |
| JP | A-2000-155038 | 6/2000 |
| JP | A-2001-108700 | 4/2001 |
| JP | A-2002-267494 | 9/2002 |

OTHER PUBLICATIONS

Office Action dated Apr. 14, 2009 from Japan Patent Office in corresponding JP application No. 2007-223361 (and English Translation).

* cited by examiner

*Primary Examiner* — Jermele M Hollington
(74) *Attorney, Agent, or Firm* — Posz Law Group, PLC

(57) ABSTRACT

A rotation detection sensor for detecting both rotational position and direction of a rotating body with a gear includes a magnet, multiple magnetic sensors, a rotational position detection circuit, and a rotational direction detection circuit. The magnet produces a magnetic field directed to a gear tooth of the rotating body. When the rotating body rotates, the magnetic sensors output sensor signals shifted in phase from each other. The rotational position detection circuit performs a differential operation on the sensor signals received from at least two magnetic sensors and outputs a rotational position signal. The rotational direction detection circuit outputs a rotational direction signal based on the position signal and the sensor signal received from at least one of the at least two magnetic sensors.

6 Claims, 12 Drawing Sheets

ROTATION DETECTION SENSOR

CROSS REFERENCE TO RELATED APPLICATION

This application is based on and incorporates herein by reference Japanese Patent Application No. 2007-223361 filed on Aug. 30, 2007.

FIELD OF THE INVENTION

The present invention relates to a rotation detection sensor for detecting both rotational position and direction of a rotating body.

BACKGROUND OF THE INVENTION

U.S. Pat. No. 6,452,381 corresponding to JP-A-H11-237256 discloses a rotation detection sensor for detecting a rotational position of a rotating body with gear teeth. This type of rotation detection sensor includes a bias magnet and two magnetic sensors. The bias magnet produces a magnetic field directed to the gear teeth of the rotating body. When the rotating body rotates, the magnetic field changes with movement between crest and root of the gear teeth. Each magnetic sensor detects the change in the magnetic field and output a sensor signal having a different phase. The rotational position of the rotating body is detected based on the sensor signals.

As described above, at least two magnetic sensors are required to detect a rotational position of a rotating body. Likewise, at least two magnetic sensors are required to detect a rotational direction of the rotating body. Therefore, when the rotation detection sensor is configured to detect both rotational position and direction of the rotating body, the rotation detection sensor needs at least four magnetic sensors. Since the number of the magnetic sensors included in the rotation detection sensor increases, the size of the rotation detection sensor increases accordingly.

SUMMARY OF THE INVENTION

In view of the above-described problem, it is an object of the present invention to provide a rotation detection sensor configured to detect both rotational position and direction of a rotating body using a reduced number of magnetic sensors.

A rotation detection sensor for detecting both rotational position and direction of a rotating body with a gear includes a magnet, multiple magnetic sensors, a rotational position detection circuit, and a rotational direction detection circuit. The magnet produces a magnetic field directed to a gear tooth of the rotating body. The magnetic sensors are located between the gear and the magnet and aligned along an imaginary straight line perpendicular to a magnetic center axis of the magnet. The magnetic sensors output sensor signals shifted in phase from each other. Each sensor signal has a voltage or current value that changes depending on the magnetic field. The rotational position detection circuit receives the sensor signals from at least two magnetic sensors. The rotational position detection circuit performs a differential operation on the received sensor signals to output a position signal indicating a rotational position of the rotating body. The rotational direction detection circuit receives the sensor signal from at least one of the at least two magnetic sensors. The rotational direction detection circuit outputs a direction signal indicating a rotational direction of the rotating body based on the position signal and the received sensor signal.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS

First Embodiment

Figure 1:
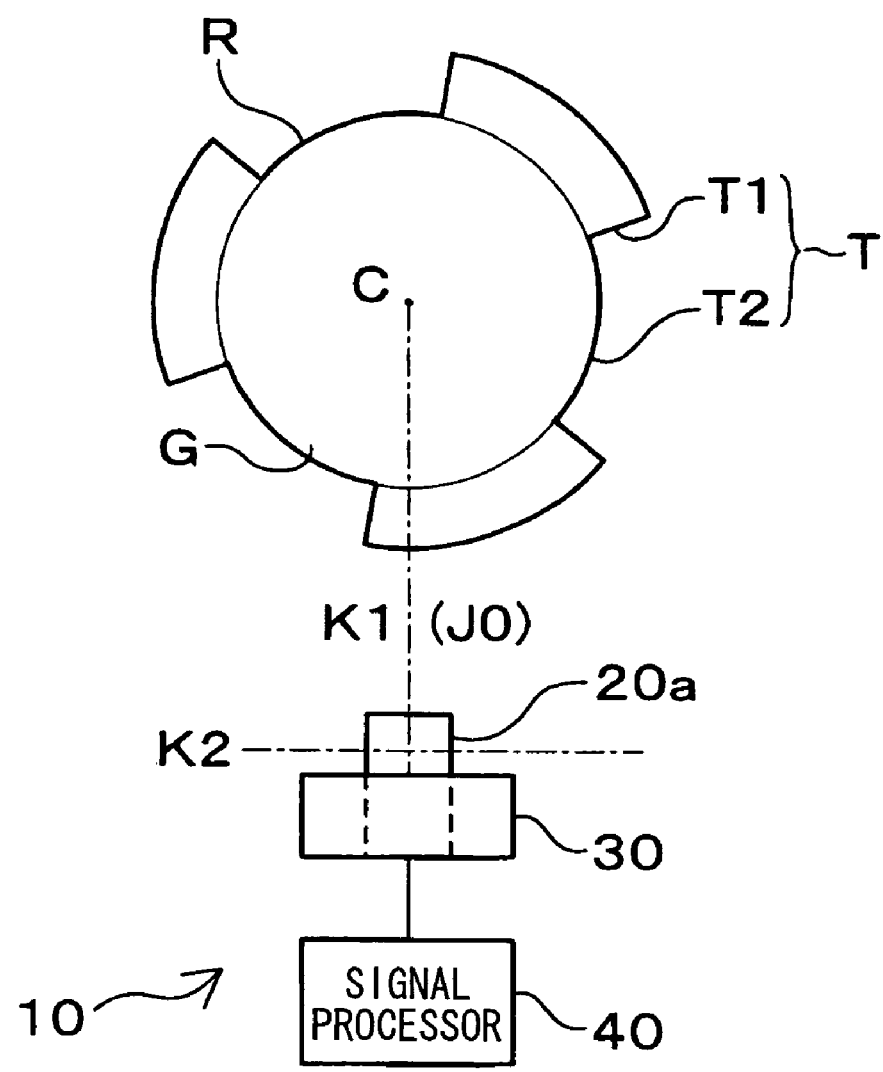
FIG. 1 is a diagram illustrating a rotation detection sensor according to a first embodiment of the present invention.

Referring to FIG. 1, a rotation detection sensor 10 according to a first embodiment of the present invention includes a sensor chip 20a, a bias magnet 30, and a signal processor 40. The rotation detection sensor 10 is configured to detect both rotational position and direction of a rotor R. For example, the rotation detection sensor 10 can be used to detect a crankshaft angle of an internal-combustion engine.

For example, the rotor R rotates with an engine crankshaft (not shown), which serves as a rotation axis. As shown in FIG. 1, the rotor R has a gear G located around its periphery. For example, the gear G is made of a magnetic material and has a gear tooth T with a crest T1 and a root T2. In FIG. 1, C represents a center of rotation of the rotor R.

The bias magnet 30 is shaped in the form of a hollow tube and produces a magnetic field directed to the gear tooth T. The bias magnet 30 has a front surface and a back surface opposite to the front surface. The front surface of the bias magnet 30 is located on the rotor R side, and the back surface of the bias magnet 30 is located on the signal processor 40 side. The bias magnet 30 is formed such that one of the front and back surfaces can serve as a north pole and the other of the front and back surfaces can serve as a south pole. For example, the bias magnet 30 is positioned relative to the rotor R so that a center axis J0 of the bias magnet 30 can intersect with the rotation center C of the rotor R. Thus, a magnetic center of the bias magnet 30 is substantially perpendicular to the gear G. In FIG. 1, K1 represents an imaginary center line indicating a longitudinal center line of the sensor chip 20a, and K2 represents a imaginary straight line perpendicular to the imaginary center line K1.

Figure 2A:
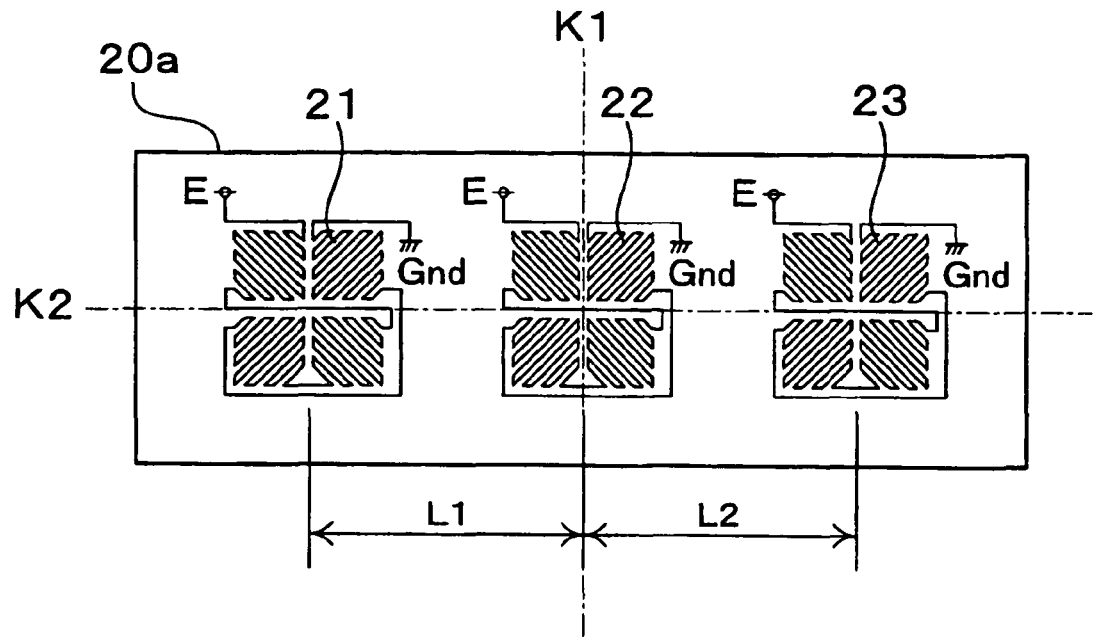
FIG. 2A is a diagram illustrating magnetic resistance elements mounted on a sensor chip of the rotation detection sensor of FIG. 1.

As shown in FIG. 2A, the sensor chip 20a includes a rectangular circuit board and three magnetic resistance element (MRE) bridges 21-23 mounted on the circuit board. The number of MRE bridges included in the sensor chip 20 can vary. For example, the sensor chip 20a can be formed by mounting the MRE bridges 21-23 onto a copper lead frame and encapsulating the lead frame with thermoset resin such as epoxy resin.

The sensor chip 20a is located between the rotor R and the bias magnet 30 in such a manner that the MRE bridges 21-23 are aligned along the imaginary straight line K2. The sensor chip 20a is located partially inside the hollow-tube-shaped bias magnet 30 in such a manner that the imaginary center line K1 (i.e., the longitudinal center line of the sensor chip 20a) can substantially coincide with the center axis J0 of the bias magnet 30. Therefore, the imaginary center line K1 connects the rotational center C of the rotor R and the imaginary straight line K2 in the shortest distance. The MRE bridge 22 is located as close to the imaginary center line K1 as possible.

As shown in FIG. 2A, the MRE bridge 22 is located between the MRE bridges 21, 23. A distance L1 between the MRE bridges 21, 22 is equal to a distance L2 between the MRE bridges 22, 23 in a direction along the imaginary straight line K2. Each of the MRE bridges 21-23 is supplied with a power supply voltage E with respect to a reference potential (i.e., ground potential) Gnd.

In the first embodiment, the MRE bridge 22, which is located between the MRE bridges 21, 23, lies on the imaginary center line K1. Therefore, the MRE bridge 22 is located closer to the rotor R than the MRE bridges 21, 23 are located. In short, a distance between the rotor R and the MRE bridge 22 is less than a distance between the rotor R and any one of the MRE bridges 21, 23.

Figure 2B:
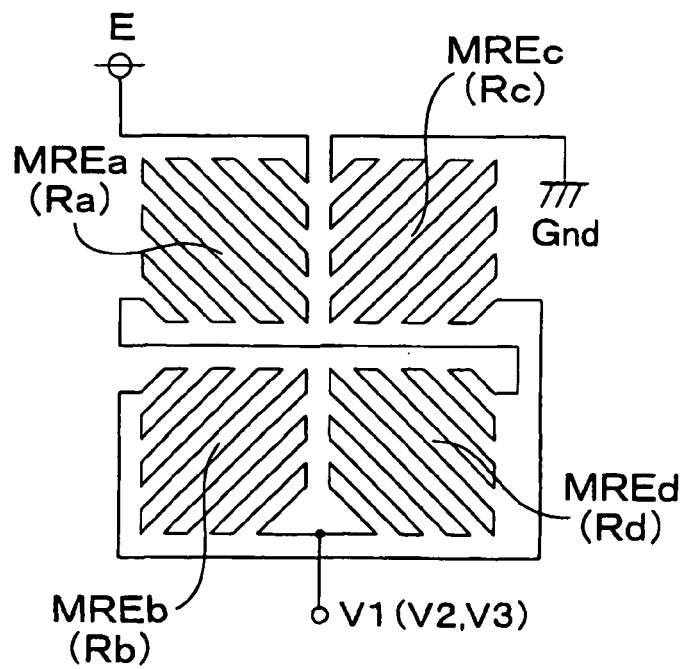
FIG. 2B is a diagram illustrating each magnetic resistance element of FIG. 2A.

As shown in FIG. 2B, each of the MRE bridges 21-23 includes four MRE elements MREa-MREd, each of which is made of a ferromagnetic material (e.g., nickel-cobalt alloy, or nickel-iron alloy) having an anisotropic magnetoresistance effect. Each of the elements MREa-MREd has long and short portions that are connected in the form of a comb. The elements MREa-MREd have resistances Ra-Rd, respectively.

A resistance change in each of the elements MREa-MREd occurs due to the long portion rather than the short portion. Therefore, each of the elements MREa-MREd has a detection axis directed in a direction along the long portion. Since the long portion of each of the elements MREa-MREd extends in a different direction, the detection axis of each of the elements MREa-MREd is directed to a different direction. The number and length of the long and short portions are equal among the elements MREa-MREd.

As shown in FIG. 2B, the four elements MREa-MREd are arranged in a matrix of two rows and two columns. Specifically, the element MREa is located in the first row and the first column, the element MREb is located in the second row and the first column, the MREc is located in the first row and the second column, and the MREd is located in the second row and the second column. Each column is aligned parallel to the magnetic center of the bias magnet 30, and each row is aligned along the rotational direction of the rotor R. The detection axis of each of the elements MREa, MREd is oriented at an angel of about 45 degrees with respect to the magnetic center of the bias magnet 30. The detection axis of each of the elements MREb, MREc is oriented at an angel of about minus 45 degrees with respect to the magnetic center of the bias magnet 30.

Therefore, the detection axis of each of the elements MREa, MREd is orthogonal to the detection axis of each of the elements MREb, MREc. When the resistances Ra, Rd of the elements MREa, MREd increase with a change in a magnetic field applied to the MRE bridges 21-23, the resistances Rb, Rc of the elements MREb, MREc decrease with the magnetic field change. Conversely, when the resistances Ra, Rd of the elements MREa, MREd decrease with the magnetic field change, the resistances Rb, Rc of the elements MREb, MREc increase with the magnetic field change.

Figure 2C:
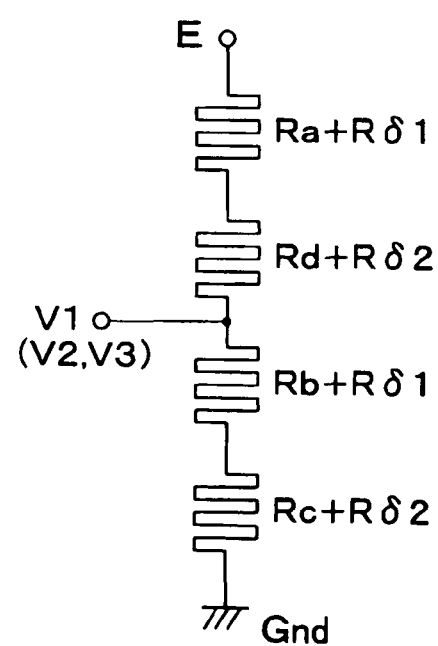
FIG. 2C is a diagram illustrating an equivalent circuit of FIG. 2B.

As can be clearly seen from FIG. 2C, the elements MREa, MREd, MREb, and MREc are connected in series in the mentioned order between the power supply voltage E and the ground potential Gnd. Specifically, the element MREa is connected to the power supply voltage E at one end and connected to the MREd at the other end. The element MREd is connected to the element MREa at one end and connected to the MREb at the other end. The element MREb is connected to the element MREd at one end and connected to the MREc at the other end. The element MREc is connected to the element MREb at one end and connected to the ground potential Gnd at the other end. A potential at a node between the elements MREd, MREb of the MRE bridge 21 is outputted as a sensor signal V1. Likewise, a potential V2 at a node between the elements MREd, MREb of the MRE bridge 22 is outputted as a sensor signal V2. Likewise, a potential at a node between the elements MREd, MREb of the MRE bridge 23 is outputted as a sensor signal V3. Alternatively, the elements MREc, MREb, MREd, and MREa can be connected in series in the mentioned order between the power supply voltage E and the ground potential Gnd.

The sensor signal V1 outputted from the MRE bridge 21 is given by the following equation:

$$V1 = \frac{E(Rb + R\sigma1 + Rc + R\sigma2)}{(Ra + R\sigma1 + Rb + R\sigma2 + Rc + R\sigma1 + Rd + R\sigma2)} = \frac{E(Rb + Rc + (R\sigma1 + R\sigma2))}{(Ra + Rb + Rc + Rd + 2(R\sigma1 + R\sigma2))}$$

In the above equation, Rσ1, Rσ2 represent resistance changes resulting from magnetostrictive effects caused by external stresses σ1, σ2 exerted on the MRE bridge 21. A term "Rσ1+Rσ2" is included in each of the numerator and the denominator of the equation. Therefore, when the resistances Ra-Rd of the elements MREa-MREd are equal to each other, the sensor signal V1 is not influenced by a difference between the external stresses σ1, σ2.

The elements MREa, MREd are located in different columns of the matrix, and the elements MREb, MREc are located in the different columns of the matrix. Specifically, whereas the elements MREa, MREb are located in the first column, the elements MREc, MREd are located in the second column. Therefore, for example, even when different external stresses σ1, σ2 are respectively exerted on the first and second columns, respectively, the sum of the magnetostrictive effects in the elements MREa, MREd can be equal to the sum of the magnetostrictive effects in the elements MREb, MREc. Thus, when the resistances Ra-Rd of the elements MREa-MREd are equal to each other, the sensor signal V1 can accurately indicate the direction of the bias magnetic field applied to the MRE bridge 21 regardless of the difference between the external stresses σ1, σ2. Each of the MRE bridges 22, 23 is configured in the same manner as the MRE bridge 21.

The sensor signals V1-V3 have different phases. That is, the sensor signals V1-V3 are shifted in phase from each other. The signal processor 40 receives the sensor signals V1-V3 from the sensor chip 20a and performs a differential operation on the sensor signals V1-V3.

Figure 3:
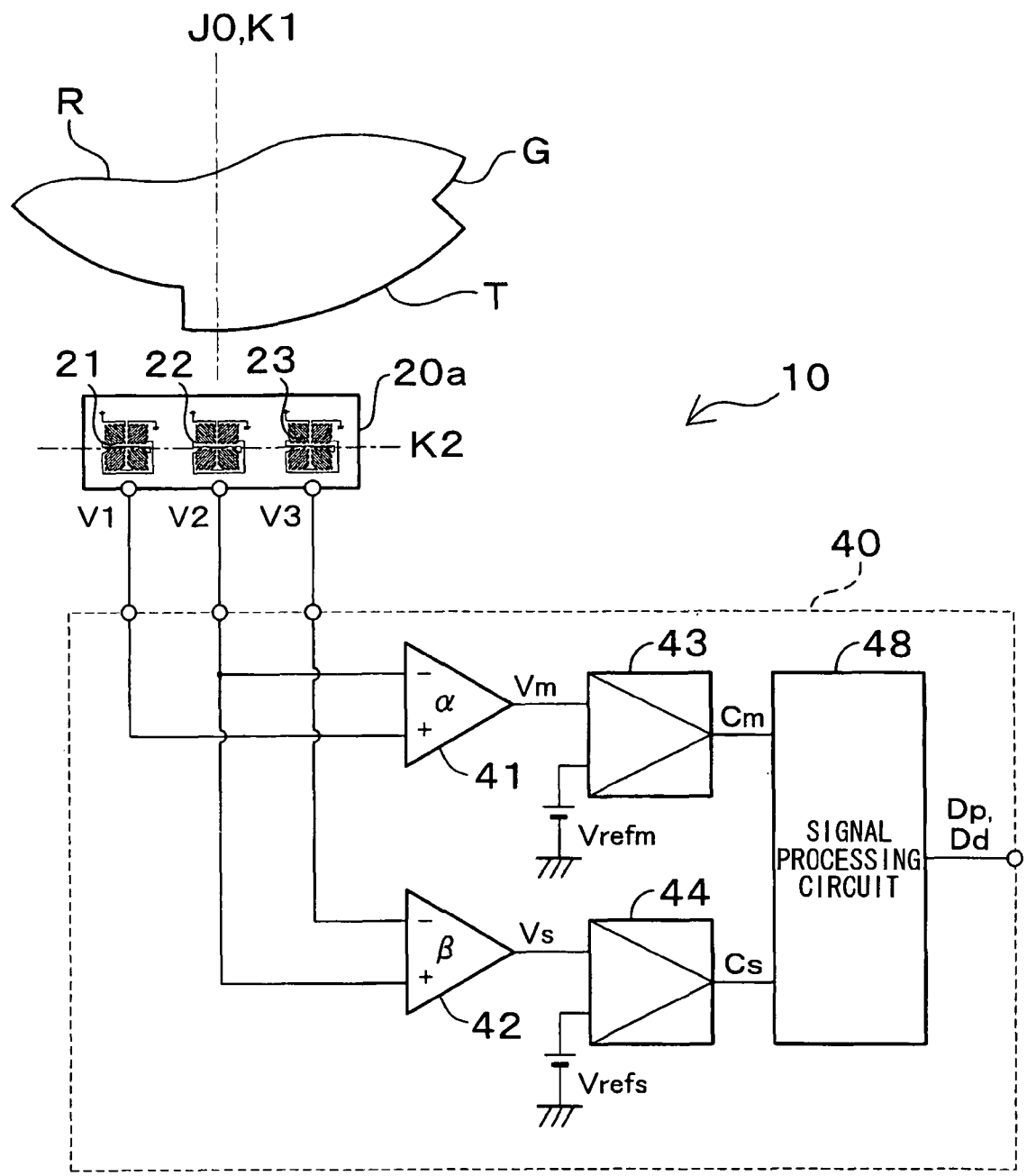
FIG. 3 is a circuit diagram illustrating the rotation detection sensor of FIG. 1.

For example, as shown in FIG. 3, the signal processor 40 includes operational amplifiers (op-amp) 41, 42, comparators 43, 44, and a signal processing circuit 48. The op-amp 41 has a gain of a (e.g., two or three), and the op-amp 42 has a gain of β (e.g., two or three).

The op-amp 41 has a non-inverting input (+) for receiving the sensor signal V1 from the MRE bridge 21 and an inverting input (−) for receiving the sensor signal V2 from the MRE bridge 22. The op-amp 41 multiplies a difference between the sensor signals V1, V2 by the gain α, thereby outputting a a differential signal Vm (=α(V1−V2)) to the comparator 43. The comparator 43 has a first input for receiving the differential signal Vm from the op-amp 41 and a second input for receiving a reference voltage Vrefm as a threshold voltage Vth.

The op-amp 42 has a non-inverting input (+) for receiving the sensor signal V2 from the MRE bridge 22 and an inverting input (−) for receiving the sensor signal V3 from the MRE bridge 23. The op-amp 42 multiplies a difference between the sensor signals V2, V3 by the gain β, thereby outputting a a differential signal Vs (=β(V2−V3)) to the comparator 44. The comparator 44 has a first input for receiving the differential signal Vs from the op-amp 42 and a second input for receiving a reference voltage Vrefs as the threshold voltage Vth.

Figure 4A:
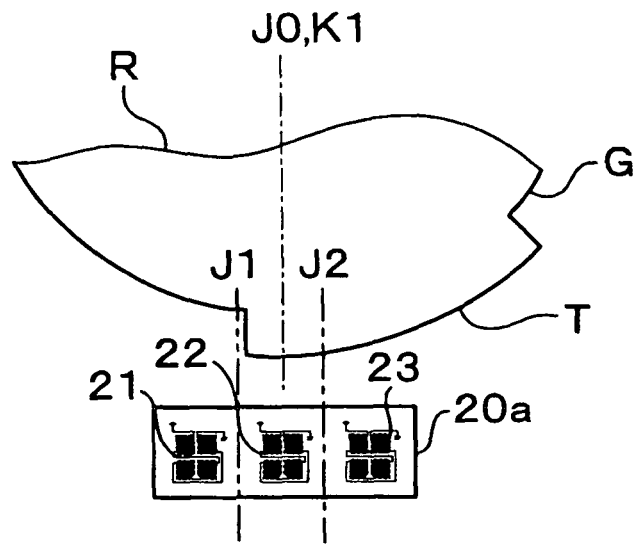
FIG. 4A is a diagram illustrating magnetic centers of the magnetic resistance elements of FIG. 2A.
Figure 4B:
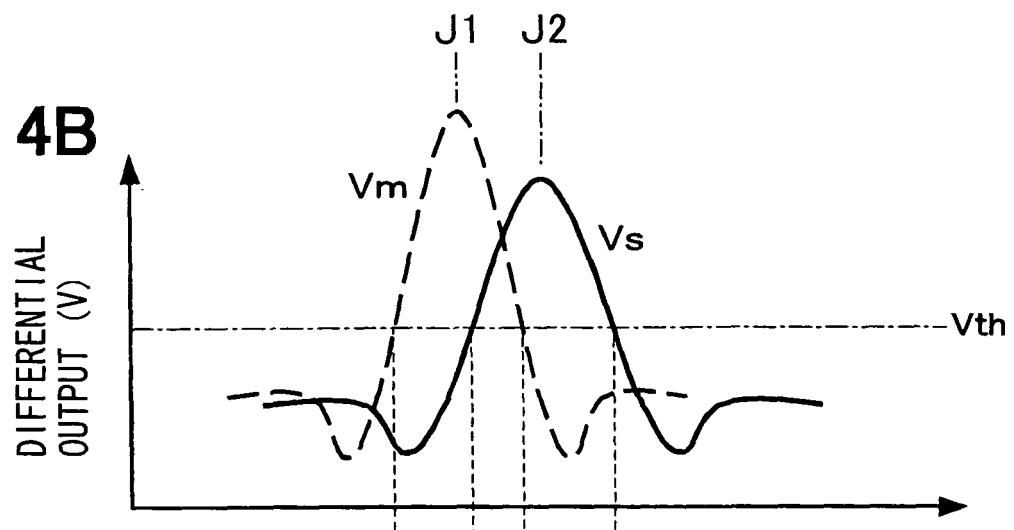
FIG. 4B is a diagram illustrating outputs of operational amplifiers included in a signal processor of the rotation detection sensor of FIG. 1.

As shown in FIG. 4B, when the differential signal Vm outputted from the op-amp 41 becomes greater than the threshold voltage Vth, an output signal Cm of the comparator 43 becomes high. Conversely, when the differential signal Vm becomes less than the threshold voltage Vth, the output signal Cm of the comparator 43 becomes low.

A peak value of the differential signal Vm represents a magnetic center J1 positioned substantially in a center between the MRE bridges 21, 22. Therefore, by adjusting the threshold voltage Vth, it can be determined that the gear tooth T of the rotor R comes in close proximity to the magnetic center J1 of the MRE bridges 21, 22. Thus, the rotational position of the rotor R can be detected based on the differential signal Vm. Specifically, the rotational position of the rotor R can be detected based on a logic level of the output signal Cm of the comparator 43.

Likewise, as shown in FIG. 4B, when the differential signal Vs outputted from the op-amp 42 becomes greater than the threshold voltage Vth, an output signal Cs of the comparator 44 becomes high. Conversely, when the differential signal Vs becomes less than the threshold voltage Vth, the output signal Cs of the comparator 44 becomes low.

A peak value of the differential signal Vs represents a magnetic center J2 positioned substantially in a center between the MRE bridges 22, 23. Therefore, by adjusting the threshold voltage Vth, it can be determined that the gear tooth T of the rotor R comes in close proximity to the magnetic center J2 of the MRE bridges 22, 23. Thus, the rotational position of the rotor R can be detected based on the differential signal Vs. Specifically, the rotational position of the rotor R can be detected based on a logic level of the output signal Cs of the comparator 44.

As described above, the rotational position of the rotor R can be detected based on at least one of the differential signal Vm, Vs. In the first embodiment, the rotational position of the rotor R is detected using only the differential signal Vm. The differential signal Vs is used to detect the rotational direction of the rotor R.

Figure 4C:
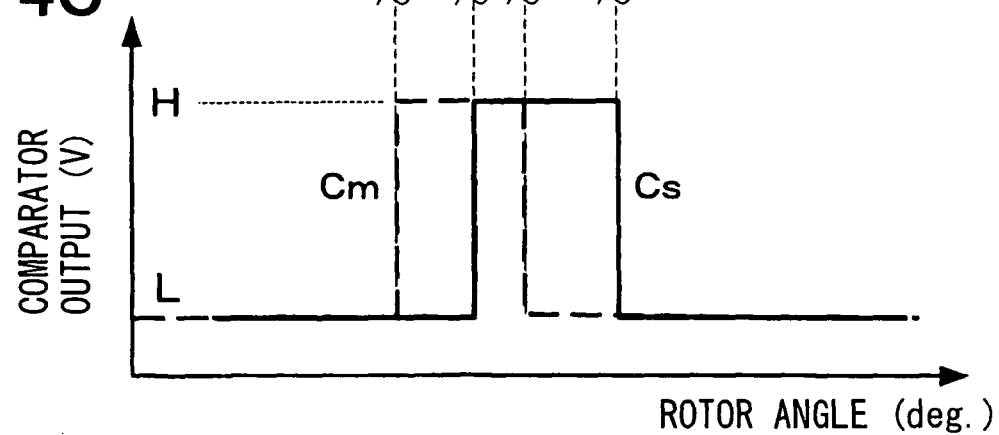
FIG. 4C is a diagram illustrating outputs of comparators included in the signal processor.

As described above, whereas the differential signal Vm outputted from the op-amp 41 is peaked at the magnetic center J1 positioned substantially in the center between the MRE bridges 21, 22, the differential signal Vs outputted from the op-amp 42 is peaked at the magnetic center J2 positioned substantially in the center between the MRE bridges 22, 23. Therefore, the rotational direction of the rotor R can be detected based on a positional relationship between the differential signals Vm, Vs. By the way, each of the MRE bridges 21-23 is constructed with magnetic resistance elements. Due to characteristics of magnetic resistance elements, the differential signals Vm, Vs can be sharply peaked as shown in FIGS. 4B, 4C.

Figure 5A:
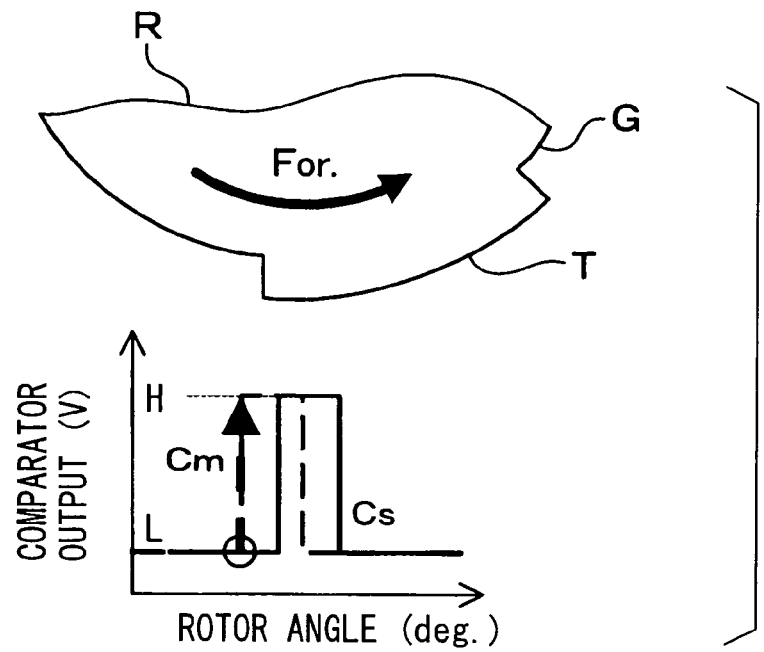
FIG. 5A is a diagram illustrating the outputs of the comparators at a time when a rotor rotates in a forward direction.

For example, the positional relationship between the differential signals Vm, Vs can be considered as a positional relationship between rising edges of the output signals Cm, Cs of the comparators 43, 44. Specifically, as shown in FIG. 5A, when the rotor R rotates in a forward direction For, the gear tooth T approaches the sensor chip 20a from the MRE bridge 21 side. Therefore, the differential signal Vm is inputted to the comparator 43, before the differential signal Vs is inputted to the comparator 44.

Accordingly, the output signal Cm of the comparator 43 becomes high, before the output signal Cs of the comparator 44 becomes high. That is, as shown in FIG. 5A, the output signal Cs of the comparator 44 remains low at a moment when the output signal Cm of the comparator 43 rises from low to high. The moment is indicated by a circle in FIG. 5A.

Figure 5B:
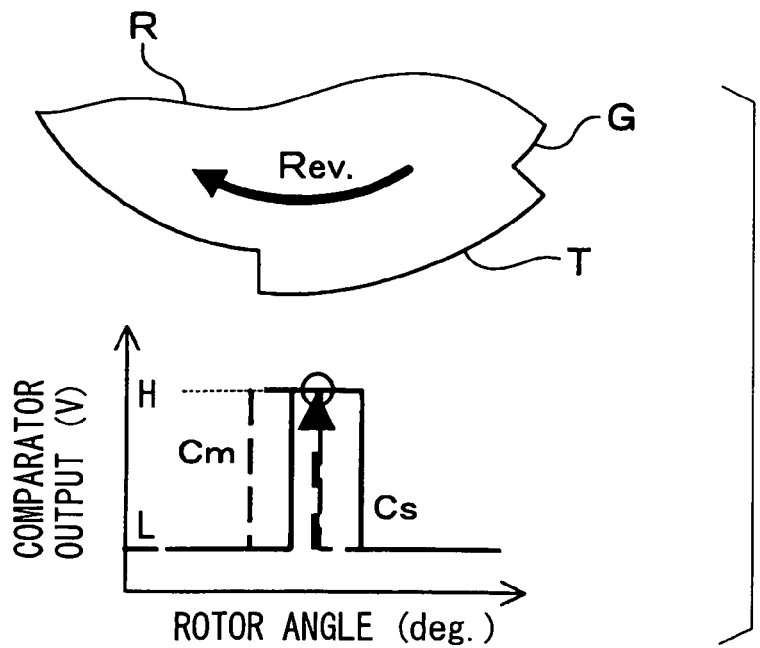
FIG. 5B is a diagram illustrating the outputs of the comparators at a time when the rotor rotates in a reverse direction.

Conversely, as shown in FIG. 5B, when the rotor R rotates in a reverse direction Rev, the gear tooth T approaches the sensor chip 20 from the MRE bridge 23 side. Therefore, the differential signal Vs is inputted to the comparator 44, before the differential signal Vm is inputted to the comparator 43.

Accordingly, the output signal Cs of the comparator 44 becomes high, before the output signal Cm of the comparator 43 becomes high. That is, as shown in FIG. 5B, the output signal Cs of the comparator 44 remains high at a moment when the output signal Cm of the comparator 43 rises from low to high. The moment is indicated by a circle in FIG. 5B.

Therefore, the rotational direction of the rotor R can be detected based on the logic level of the output signal Cs of the comparator 44. Specifically, if the output signal Cs of the comparator 44 remains low at a moment when the output signal Cm of the comparator 43 rises from low to high, it is determined that the rotor R rotates in the forward direction. If the output signal Cs of the comparator 44 remains high at the moment when the output signal Cm of the comparator 43 rises from low to high, it is determined that the rotor R rotates in the reverse direction.

As can be understood from FIGS. 4B, 4C, the length of the high level period of the output signals Cm, Cs can be adjusted by adjusting the gains α, β, of the op-amp 41, 42 and the threshold voltage Vth of the comparators 43, 44.

For example, in the first embodiment, the gains α, β and the threshold voltage Vth are adjusted in such a manner that the high level period of the output signal Cs can be longer than the high level period of the output signal Cm, and that the output signal Cm can rise from low to high substantially in the middle of the high level period of the output signal Cs. In such an approach, the logic level of the output signal Cs at the moment when the output signal Cm rises from low to high is surely detected so that the rotational direction of the rotor R can be accurately detected.

As shown in FIG. 3, in the signal processor 40, the signal processing circuit 48 receives the output signals Cm, Cs from the comparators 43, 44, respectively. The signal processing circuit 48 performs signal processing on the output signals Cm, Cs to detect the rotational position and direction of the rotor R. Then, the signal processing circuit 48 outputs rotational position data Dp indicating the rotational position of the rotor R and rotational direction data Dd indicating the rotational direction of the rotor R. For example, the signal processing circuit 48 can include a logic circuit, a digital signal processor (DPS), and/or the like.

For example, the rotational position data Dp becomes high, when the gear tooth T of the rotor R is positioned within a predetermined angle range. Conversely, the rotational position data Dp becomes low, when the gear tooth T is positioned outside the predetermined angle range. For example, the rotational direction data Dd becomes low, when the rotor R rotates in the forward direction. The rotational direction data Dd becomes high, when the rotor R rotates in the reverse direction.

As described above, according to the rotation detection sensor 10 of the first embodiment, the sensor chip 20a is configured to detect both rotational position and direction of the rotor R using three MRE bridges 21-23. The sensor chip 20a is located between the gear G of the rotor R and the bias magnet 30 in such a manner that the MRE bridges 21-23 can be aligned along the imaginary straight line K2, which is perpendicular to the center axis J0 of the bias magnet 30. Since the MRE bridge 22 is located between the MRE bridges 21, 23, the MRE bridge 22 is located closer to the rotor R than the MRE bridges 21, 23 are located. In short, the distance between the rotor R and the MRE bridge 22 is less than the distance between the rotor R and any one of the MRE bridges 21, 23. The sensor signals V1-V3 outputted from the MRE bridges 21-23 are shifted in phase from each other.

The op-amp 41 performs the differential operation on the sensor signals V1, V2. Specifically, the op-amp 41 multiplies the difference between the sensor signals V1, V2 by the gain α, thereby outputting the differential signal Vm. The comparator 43 compares the differential signal Vm with the threshold voltage Vth (i.e., reference voltage Vrefm) and outputs the output signal Cm in accordance with the result of the comparison. The rotational position of the rotor R is detected based on the logic level of the output signal Cm.

The op-amp 42 performs the differential operation on the sensor signals V2, V3. Specifically, the op-amp 42 multiplies the difference between the sensor signals V2, V3 by the gain β, thereby outputting the differential signal Vs. The MRE bridge 22, which outputs the sensor signal V2, is located as close to the imaginary center line K1 as possible. The MRE bridge 23, which outputs the sensor signal V3, is located further away from the imaginary center line K1 than the MRE bridge 22. The imaginary center line K1 connects the rotational center C of the rotor R and the imaginary straight line K2 in the shortest distance. The comparator 43 compares the differential signal Vs with the threshold voltage Vth (i.e., reference voltage Vrefs) and outputs the output signal Cs in accordance with the result of the comparison. The rotational direction of the rotor R is detected based on the logic levels of the output signals Cm, Cs.

Figure 6A:
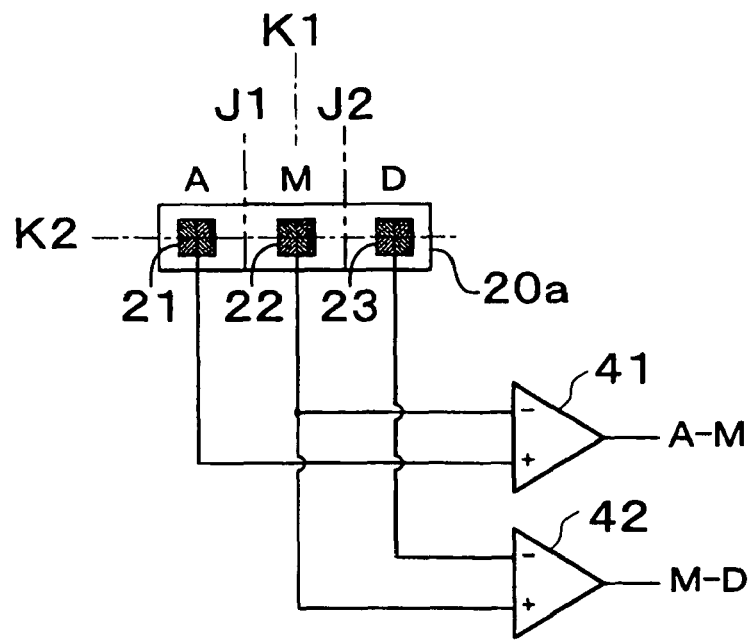
FIG. 6A is a circuit diagram illustrating connection between the sensor chip and the operational amplifiers of the rotation detection sensor of FIG. 1.
Figure 6B:
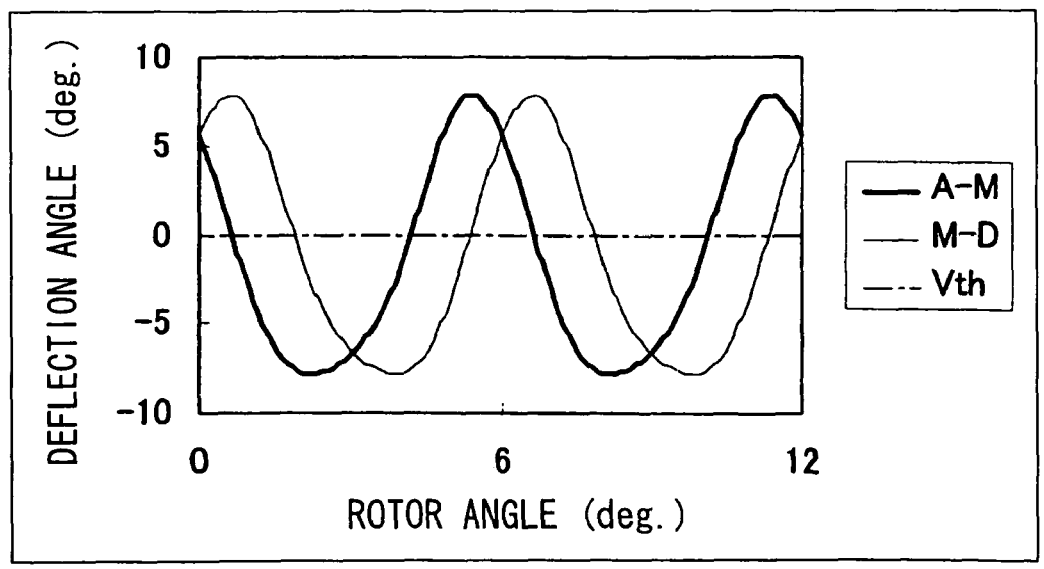
FIG. 6B is a diagram illustrating outputs of the operational amplifiers of FIG. 6A.

The first embodiment can be summarized as shown in FIGS. 6A, 6B. As shown in FIG. 6A, the rotational position of the rotor R is detected using two sensor signals A, M outputted from the MRE bridges 21, 22, respectively. The sensor signal M outputted from the MRE bridge 22 is also used to detect the rotational direction of the rotor R. In such an approach, the number of MRE bridges (i.e., magnetic sensors) specialized to detect the rotational direction of the rotor R can be reduced.

In FIG. 6A, the sensor signals A, M outputted from the MRE bridges 21, 22 are inputted to the op-amp 41 so that the op-amp 41 outputs a differential signal A-M to the comparator 43 (not shown in FIG. 6A). Likewise, the sensor signals M, D outputted from the MRE bridges 22, 23 are inputted to the op-amp 42 so that the op-amp 42 outputs a differential signal M-D to the comparator 44 (not shown in FIG. 6A). In FIG. 6B, the differential signals A-M, M-D are represented as a deflection angle of a magnetic vector. The comparators 43, 44 output the output signals Cm, Cs by comparing the differential signals A-M, M-D with the threshold voltage Vth.

Figure 7A:
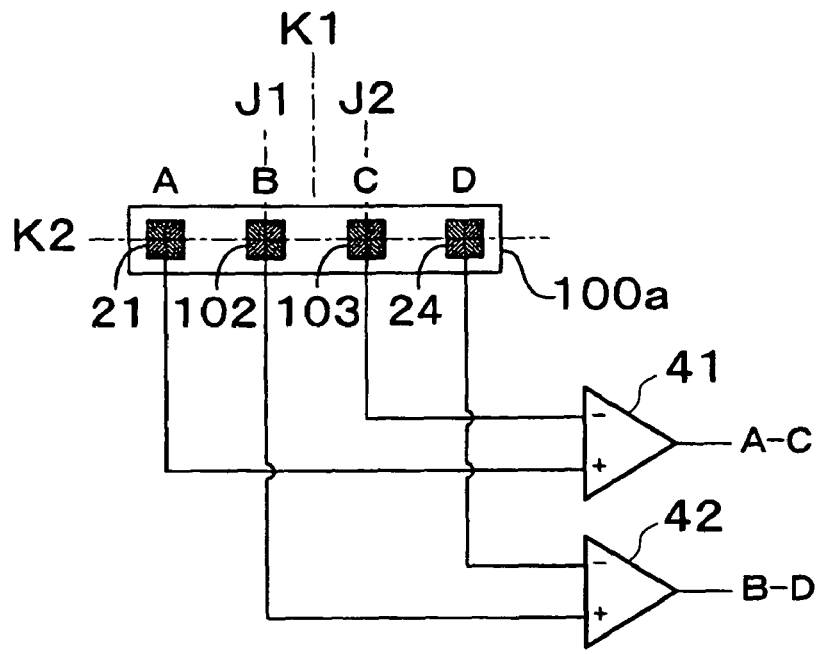
FIG. 7A is a circuit diagram illustrating connection between a sensor chip and operational amplifiers of a rotation detection sensor according to a first comparison example.
Figure 7B:
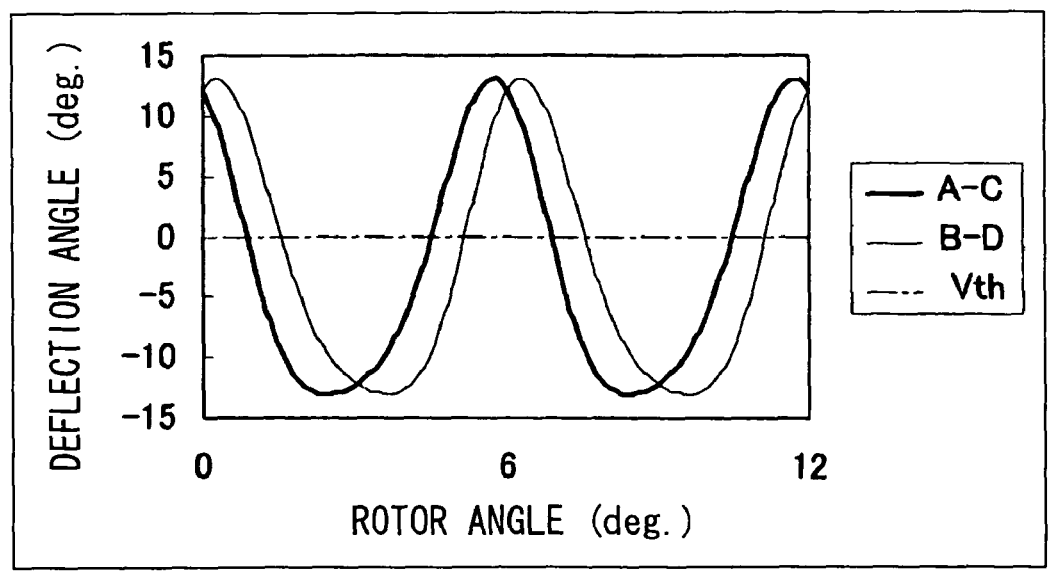
FIG. 7B is a diagram illustrating outputs of the operational amplifiers of FIG. 7A.

FIGS. 7A and 7B show a first comparison example in which two MRE bridges are specialized to detect the rotational direction of the rotor R. As shown in FIG. 7A, a sensor chip 100a of the first comparison example includes four MRE bridges 21, 102, 103, 24. Sensor signals A, C outputted from the MRE bridges 21, 103 are inputted to the op-amp 41 so that the op-amp 41 outputs a differential signal A-C to the comparator 43 (not shown in FIG. 7A). Sensor signals B, D outputted from the MRE bridges 102, 24 are inputted to the op-amp 42 so that the op-amp 42 outputs a differential signal B-D to the comparator 44 (not shown in FIG. 7A).

As can be seen from FIG. 7B, the comparators 43, 44 can output the output signals Cm, Cs by comparing the differential signals A-C, B-D with the threshold voltage Vth. Therefore, like the first embodiment, the first comparison example can detect both rotational position and direction of the rotor R. However, whereas the sensor chip 20a of the first embodiment uses three MRE bridges 21-23, the sensor chip 100a of the first comparison uses four MRE bridges 21, 24, 102, 103. Therefore, the length (i.e., size) of the sensor chip 100a become larger than that of the sensor chip 20a.

According to the rotation detection sensor 10 of the first embodiment, the op-amp 41 performs the differential operation on the sensor signals V1, V2, thereby outputting the differential signal Vm. The differential signal Vm is based on the magnetic center J1 that is positioned substantially in the center between the MRE bridges 21, 22. The op-amp 42 performs the differential operation on the sensor signals V2, V3, thereby outputting the differential signal Vs. The differential signal Vs is based on the magnetic center J2 that is positioned substantially in the center between the MRE bridges 22, 23. As shown in FIGS. 4A and 4B, since the magnetic centers J1, J2 are located in different positions, the differential signals Vm, Vs are peaked at different positions. Therefore, the rotational direction of the rotor R can be detected based on the positional relationship between the differential signals Vm, Vs. In such an approach, the number of MRE bridges included in the sensor chip 20a can be reduced. Accordingly, the length of the sensor chip 20a in the direction along the imaginary line K2 can be reduced so that the size of the sensor chip 20a can be reduced.

The first embodiment can be summarized as follows. The op-amp 41 and the comparator 43 form a rotational position detection circuit. The rotational position detection circuit performs a differential operation on the sensor signals V1, V2 and outputs a position signal Vm (Cm) indicating the rotational position of the rotor R. The op-amp 42, the comparator 44, and the signal processing circuit 48 form a rotational direction detection circuit. The rotational direction detection circuit outputs a direction signal Dd indicating the rotational direction of the rotor R based on the position signal Vm and the sensor signal V2. In this way, the sensor signal V2 is inputted to each of the rotational position detection circuit and the rotational direction detection circuit. In other words, the MRE bridge 22 is shared among the rotational position detection circuit and the rotational direction detection circuit and used to detect not only rotational position but also rotational direction of the rotor R. The shared MRE bridge 22 is located closer to the imaginary center line K1 than the MRE bridges 21, 23 are located.

Second Embodiment

A rotation detection sensor 11 according to a second embodiment of the present invention is described below with reference to FIGS. 8A and 8B. A difference between the first and second embodiments is as follows. A sensor chip 20b of the rotation detection sensor 11 includes a rectangular circuit board and five MRE bridges 21-25 mounted on the circuit board. The MRE bridges 21-25 are aligned in the mentioned order at regular intervals along the imaginary straight line K2 so that the MRE bridge 23 can be located in the middle of the five MRE bridges 21-25. The MRE bridges 24, 25 are configured in the same manner as the MRE bridges 21-23, which are described in the first embodiment with reference to FIGS. 2B, 2C.

Like the sensor chip 20a of the first embodiment, the sensor chip 20b is located partially inside the hollow-tube-shaped bias magnet 30 in such a manner that the imaginary center line K1 (i.e., a longitudinal center line of the sensor chip 20b) can substantially coincide with the center axis J0 of the bias magnet 30. The MRE bridge 23 is located as close to the imaginary center line K1 as possible.

Figure 8A:
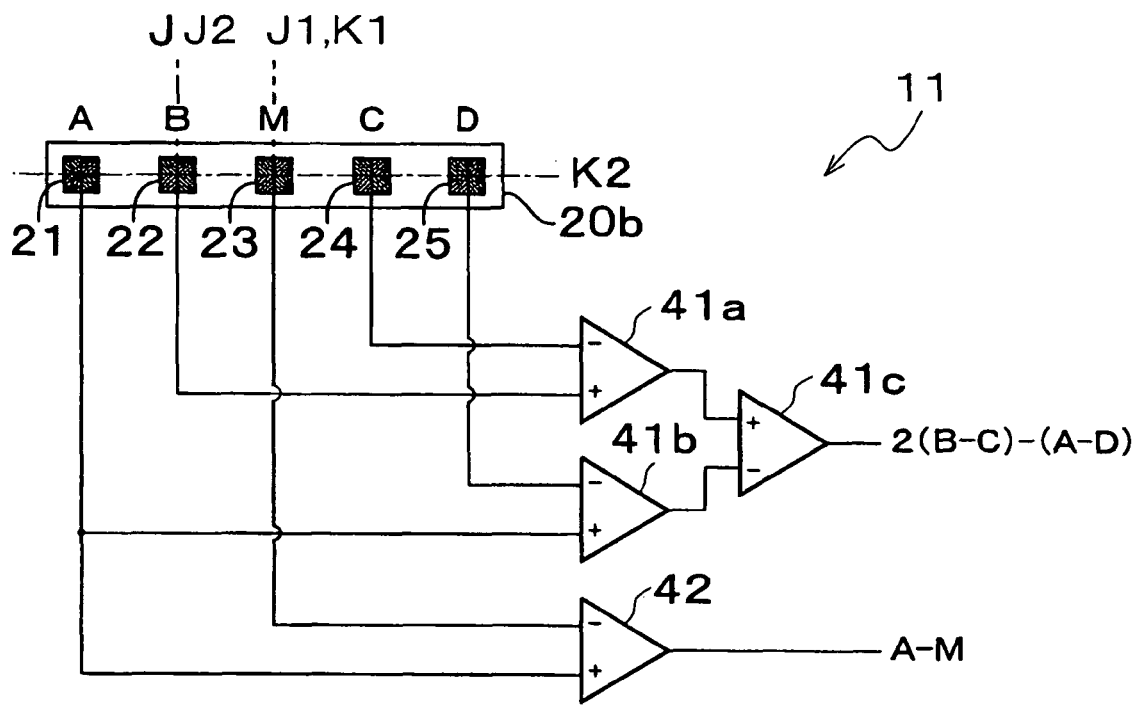
FIG. 8A is a circuit diagram illustrating connection between a sensor chip and operational amplifiers of a rotation detection sensor according to a second embodiment of the presents invention.

In the second embodiment, a signal processor 40 includes op-amps 41a-41c, 42, the comparators 43, 44 (not shown in FIG. 8A), and the signal processing circuit 48 (not shown in FIG. 8A). A sensor signal A outputted from the MRE bridge 21 is inputted to each of non-inverting inputs (+) of the op-amp 41b, 42. A sensor signal B outputted from the MRE bridge 22 is inputted to a non-inverting input (+) of the op-amp 41a. A sensor signal C outputted from the MRE bridge 24 is inputted to an inverting input (−) of the op-amp 41a. A sensor signal D outputted from the MRE bridge 25 is inputted to an inverting input (−) of the op-amp 41b.

The op-amp 41a performs a differential operation on the sensor signals B, C. Specifically, the op-amp 41a multiplies a difference between the sensor signals B, C by a gain of, for example, two, thereby outputting a differential signal 2(B-C). The op-amp 41b performs a differential operation on the sensor signals A, D. Specifically, the op-amp 41b multiplies a difference between the sensor signals A, D by a gain of, for example, one, thereby outputting a differential signal A-D. The differential signals 2(B-C), A-D are inputted to the op-amp 41c. The op-amp 41c performs a differential operation on the differential signals 2(B-C), A-D. Specifically, the op-amp 41c multiplies a difference between the differential signals 2(B-C), A-D by a gain of, for example, two, thereby outputting a differential signal 2(B-C)−(A-D) corresponding to the position signal Vm of the first embodiment.

A sensor signal M outputted from the MRE bridge 23 is inputted to an inverting input (−) of the op-amp 42. The op-amp 42 performs a differential operation of the sensor signals A, M. Specifically, the op-amp 42 multiplies a difference between the sensor signals A, M by a gain of, for example, one, thereby outputting a differential signal A-M corresponding to the differential signal Vs of the first embodiment.

In the sensor chip 20b, the MRE bridges 21, 25 are symmetrically arranged with respect to the imaginary center line K1. Likewise, the MRE bridges 22, 24 are symmetrically arranged with respect to the imaginary center line K1. Since the sensor signals A, B, C, D are differentially inputted to the op-amp 41a, 41b, a magnetic center J1 of the MRE bridges 21, 22, 24, 25 substantially coincides with the imaginary line K1.

The sensor signal A inputted to the non-inverting input (+) of the op-amp 42 is outputted from the MRE bridge 21 that is located furthest away from the imaginary line K1. Conversely, the sensor signal M inputted to the inverting input (−) of the op-amp 42 is outputted from the MRE bridge 23 that lies on the imaginary line K1. Therefore, a magnetic center J2 of the MRE bridges 21, 23 is positioned substantially in the center between the MRE bridges 21, 23.

As described above, according to the rotation detection sensor 11 of the second embodiment, the op-amp 42 performs the differential operation on the sensor signals A, M, thereby outputting the differential signal Vs (i.e., A-M). The differential signal Vs is based on the magnetic center J2 that is positioned substantially in the center between the MRE bridges 21, 23. The op-amps 41a-41c performs the differential operation on the signals A, B, C, D, thereby outputting the differential signal Vm (i.e., 2(B-C)−(A-D)). The differential signal Vm is based on the magnetic center J1 that substantially coincides with the imaginary center line K1.

Figure 8B:
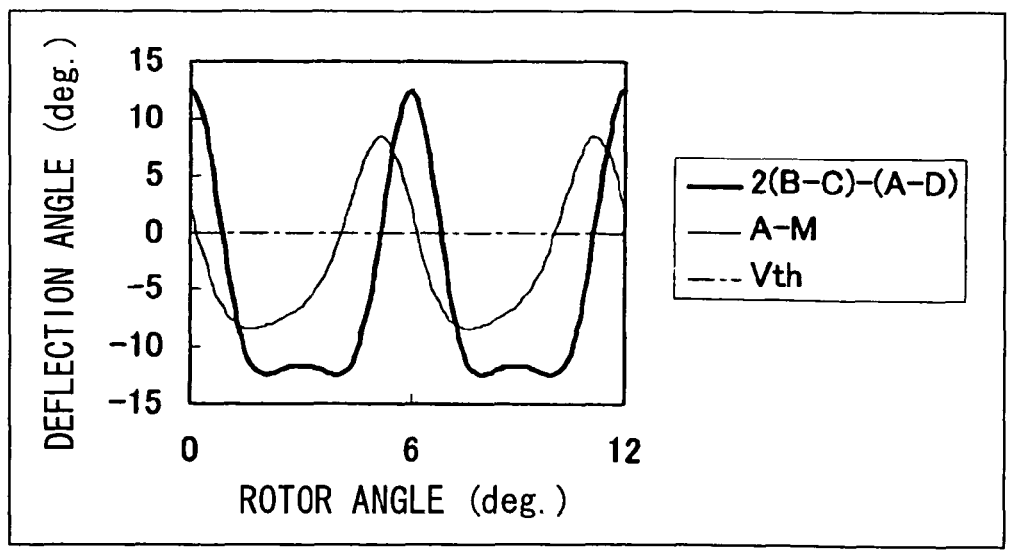
FIG. 8B is a diagram illustrating outputs of the operational amplifiers of FIG. 8A.

As shown in FIGS. 8A and 8B, since the magnetic centers J1, J2 are located in different positions, the differential signals Vm, Vs are peaked at different positions. Therefore, like the first embodiment, the rotational direction of the rotor R can be detected based on the positional relationship between the differential signals Vm, Vs.

The sensor signals A, B, C, D are outputted from the MRE bridges 21, 22, 24, 25 that are symmetrically arranged with respect to the imaginary center line K1. The MRE bridge 23 is located on the imaginary center line K1. Therefore, the MRE bridge 23 is located closer to the imaginary center line K1 than any other MRE bridges 21, 22, 24, 25. That is, a distance between the MRE bridge 23 and the imaginary center line K1 is less than a distance between any one of the MRE bridges 21, 22, 24, 25 and the imaginary center line K1.

The magnetic center J2 of the MRE bridges 21, 23 is located further away from the imaginary center line K1 than each of a magnetic center of the MRE bridges 22, 23 and a magnetic center of the MRE bridges 23, 24. In such an approach, as shown in FIG. 8B, a phase difference between the differential signal Vm (i.e., 2(B-C)−(A-D)) and the differential signal Vs (i.e., (A-M)) can be increased so that the rotational direction of the rotor R can be surely detected.

Figure 9A:
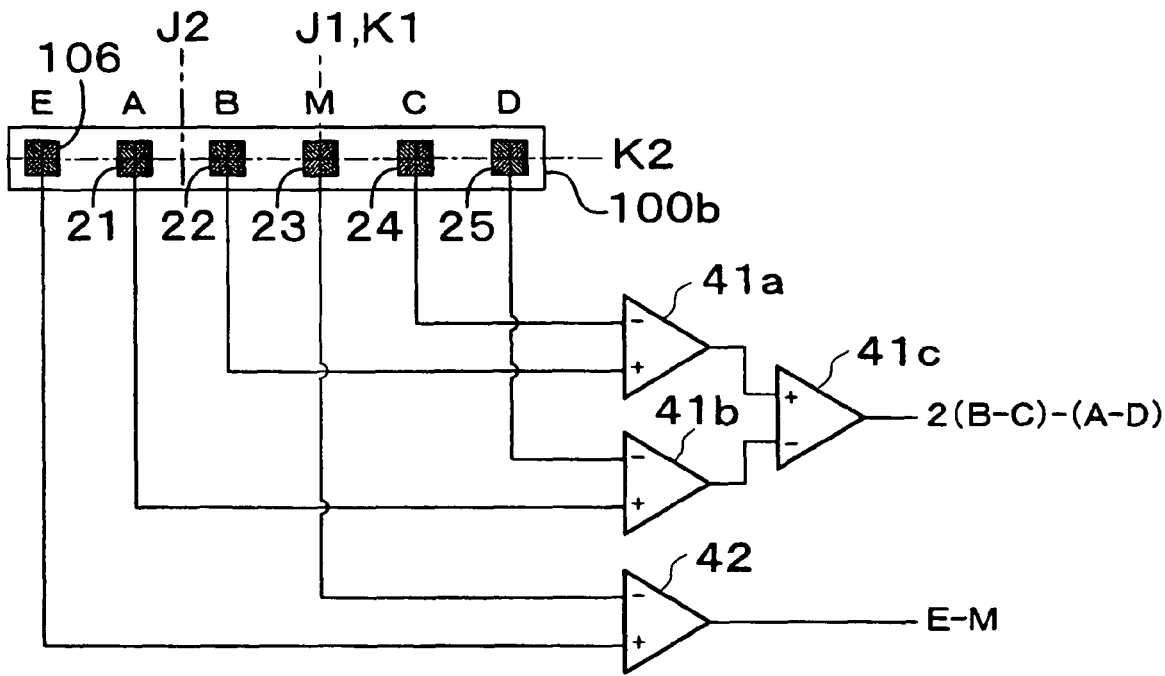
FIG. 9A is a circuit diagram illustrating connection between a sensor chip and operational amplifiers of a rotation detection sensor according to a second comparison example.
Figure 9B:
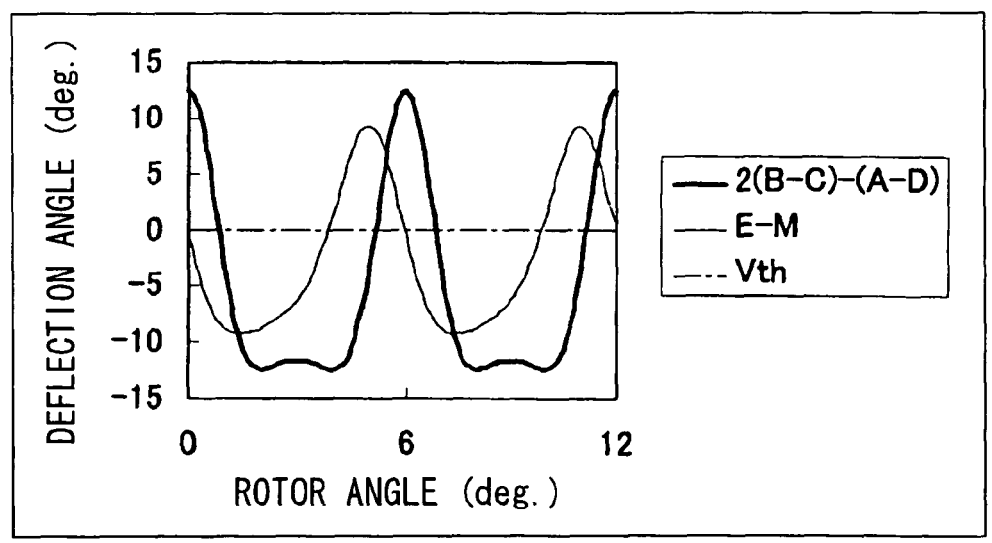
FIG. 9B is a diagram illustrating outputs of the operational amplifiers of FIG. 9A.

FIGS. 9A and 9B show a second comparison example in which two MRE bridges are specialized to detect the rotational direction of the rotor R. A sensor chip 100b of the second comparison example includes six MRE bridges 21-25, 106. A sensor signal A outputted from the MRE bridge 21 is inputted to the non-inverting input (+) of the op-amp 41b, and a sensor signal B outputted from the MRE bridge 22 is inputted to the non-inverting input (+) of the op-amp 41a. A sensor signal C outputted from the MRE bridge 24 is inputted to the inverting input (−) of the op-amp 41a, and a sensor signal D outputted from the MRE bridge 25 is inputted to the inverting input (−) of the op-amp 41b.

The op-amp 41a multiplies a difference between the sensor signals B, C by a gain of two, thereby outputting a differential signal 2(B-C). The op-amp 41b multiplies a difference between the sensor signals A, D by a gain of one, thereby outputting a differential signal A-D. The differential signals 2(B-C), A-D are inputted to the op-amp 41c so that the op-amp 41c outputs a differential signal 2(B-C)−(A-D), corresponding to the differential signal Vm, to the comparator 43.

A sensor signal M outputted from the MRE bridge 23 is inputted to the inverting input (−) of the op-amp 42, and a sensor signal E outputted from the MRE bridge 106 is inputted to the non-inverting input (+) of the op-amp 42. The op-amp 42 multiplies a difference between the sensor signals E, M by a gain of one, thereby outputting a differential signal E-M, corresponding to the differential signal Vs, to the comparator 44.

As can be seen from FIG. 9B, the comparators 43, 44 can output the output signals Cm, Cs by comparing the differential signals 2(B-C)−(A-D), E-M with the threshold voltage Vth. Therefore, like the second embodiment, the second comparison example can detect both rotational position and direction of the rotor R. However, whereas the sensor chip 20b of the second embodiment uses five MRE bridges 21-25, the sensor chip 100b of the second comparison example uses six MRE bridges 21-25, 106. Therefore, the length (i.e., size) of the sensor chip 100b becomes larger than that of the sensor chip 20b.

As described above, according to the rotation detection sensor 11 of the second embodiment, the MRE bridge 21 is used to detect both rotational position and direction of the rotor R. In such an approach, the number of MRE bridges included in the sensor chip 20b is reduced so that the length (i.e., size) of the sensor chip 20b can be reduced. Further, the phase difference between the differential signals Vm, Vs is increased so that the rotational direction of the rotor R can be surely detected.

The second embodiment can be summarized as follows. The op-amp 41a-41c and the comparator 43 form a rotational position detection circuit. The rotational position detection circuit performs a differential operation on the sensor signals A-D and outputs a position signal Vm (Cm) indicating the rotational position of the rotor R. The op-amp 42, the comparator 44, and the signal processing circuit 48 form a rotational direction detection circuit. The rotational direction detection circuit outputs a direction signal Dd indicating the rotational direction of the rotor R based on the position signal Vm and the sensor signal A. In this way, the sensor signal A is inputted to each of the rotational position detection circuit and the rotational direction detection circuit. In other words, the MRE bridge 21 is shared among the rotational position detection circuit and the rotational direction detection circuit and used to detect not only rotational position but also rotational direction of the rotor R. The shared MRE bridge 21 is located furthest away from the imaginary line K1.

Figure 10A:
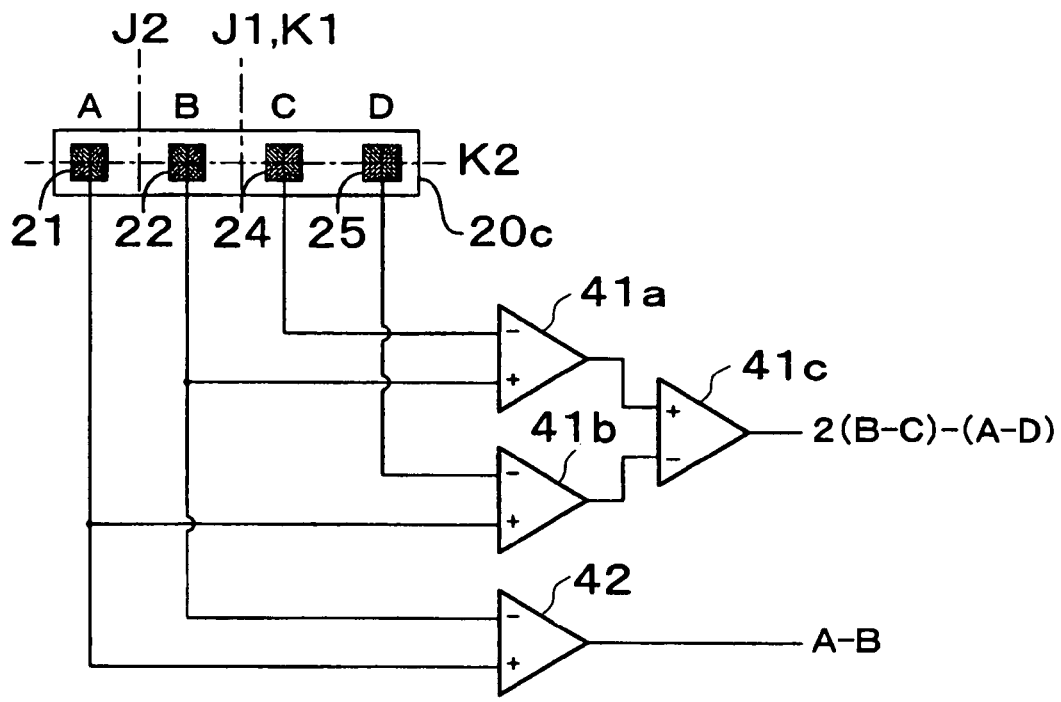
FIG. 10A is a circuit diagram illustrating connection between a sensor chip and operational amplifiers of a rotation detection sensor according to a modification of the second embodiment.
Figure 10B:
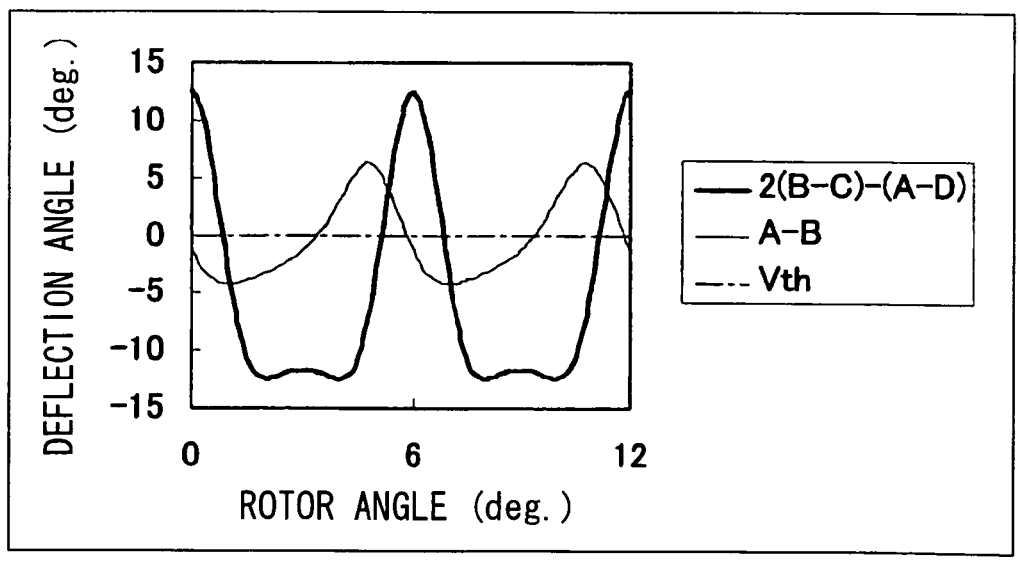
FIG. 10B is a diagram illustrating outputs of the operational amplifiers of FIG. 10A.

For example, the sensor chip 20b can be modified to a sensor chip 20c shown in FIGS. 10A, 10B. As can be seen from by comparing FIGS. 8A, 8B with FIGS. 10A, 10B, the two sensor signals B, M outputted from the MRE bridges 22, 23 of the sensor chip 20b are combined into a single sensor signal B outputted from the MRE bridge 22 of the sensor chip 20c. In addition to the non-inverting input (+) of the op-amp 41a, the single sensor signal B is inputted to the inverting input (−) of the op-amp 42. Thus, the op-amp 42 outputs a differential signal A-B corresponding to the differential signal Vs.

The sensor chip 20c can operate in a similar manner to the sensor chip 20b. The op-amp 42 performs the differential operation on the sensor signals A, B, thereby outputting the differential signal Vs (i.e., A-B). The differential signal Vs is based on the magnetic center J2 that is positioned substantially in the center between the MRE bridges 21, 22. The op-amps 41a-41c performs the differential operation on the sensor signals A, B, C, D, thereby outputting the differential signal Vm (i.e., 2(B-C)−(A-D)). The differential signal Vm is based on the magnetic center J1 that substantially coincides with the imaginary center line K1. As shown in FIGS. 10A and 10B, since the magnetic centers J1, J2 are located in different positions, the differential signals Vm, Vs are peaked at different positions. Therefore, like the first embodiment, the rotational direction of the rotor R can be detected based on the positional relationship between the differential signals Vm, Vs. Since the phase difference between the differential signals Vm, Vs is increased, the rotational direction of the rotor R can be surely detected.

Third Embodiment

A rotation detection sensor 12 according to a third embodiment of the present invention is described below with reference to FIGS. 11A and 11B. A difference between the first and third embodiments is as follows. A sensor chip 20d of the third embodiment includes a rectangular circuit board and two MRE bridges 21, 22 mounted on the circuit board. Like the sensor chip 20a of the first embodiment, the sensor chip 20d is located partially inside the hollow-tube-shaped bias magnet 30 in such a manner that the imaginary center line K1 (i.e., a longitudinal center line of the sensor chip 20d) can substantially coincide with the center axis J0 of the bias magnet 30.

Figure 11A:
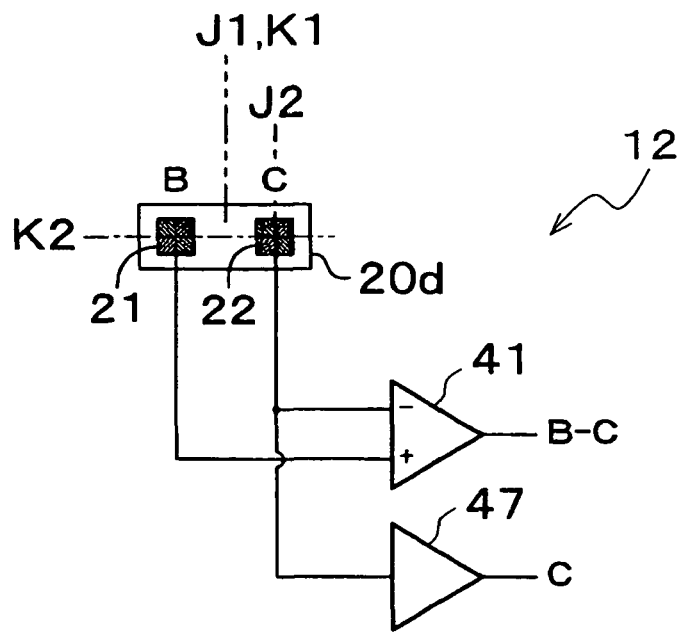
FIG. 11A is a circuit diagram illustrating connection between a sensor chip and operational amplifiers of a rotation detection sensor according to a third embodiment of the present invention.
Figure 11B:
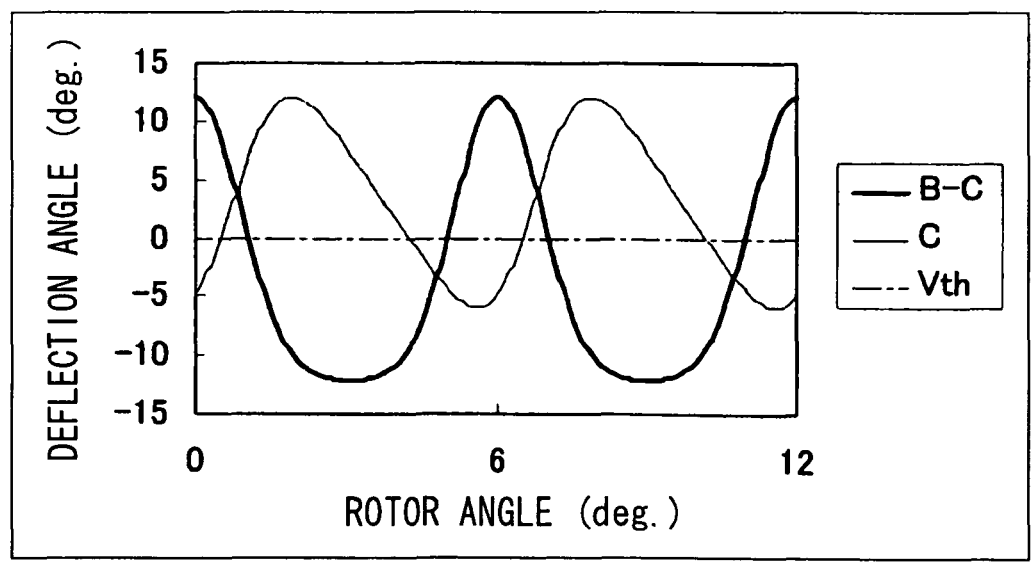
FIG. 11B is a diagram illustrating outputs of the operational amplifiers of FIG. 11A.

In the third embodiment, a signal processor 40 includes an op-amp 41, an amplifier 47, the comparators 43, 44 (not shown in FIG. 11A), and the signal processing circuit 48 (not shown in FIG. 11A).

A sensor signal B outputted from the MRE bridge 21 is inputted to a non-inverting input (+) of the op-amp 41, and a sensor signal C outputted from the MRE bridge 22 is inputted to an inverting input (−) of the op-amp 41. The op-amp 41 performs a differential operation on the sensor signals B, C. Specifically, the op-amp 41 multiplies a difference between the sensor signals B, C by a gain of, for example, one, thereby outputting a differential signal B-C, corresponding to the differential signal Vm, to the comparator 43. The sensor signal C is also inputted to the amplifier 47. The amplifier 47 outputs the sensor signal C, corresponding to the differential signal Vs, to the comparator 44.

Figure 12A:
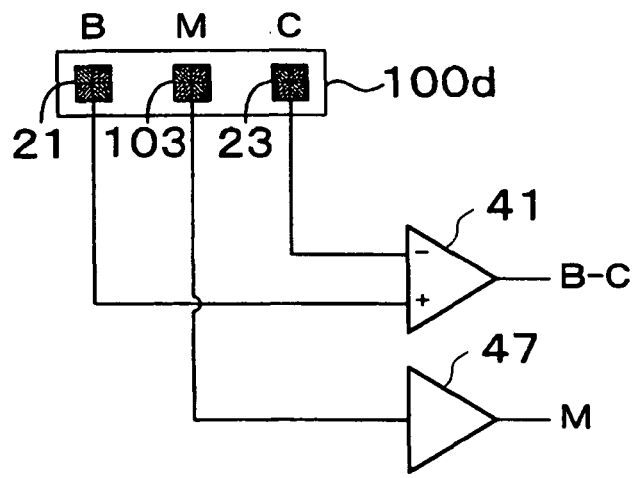
FIG. 12A is a circuit diagram illustrating connection between a sensor chip and operational amplifiers of a rotation detection sensor according to a third comparison example.
Figure 12B:
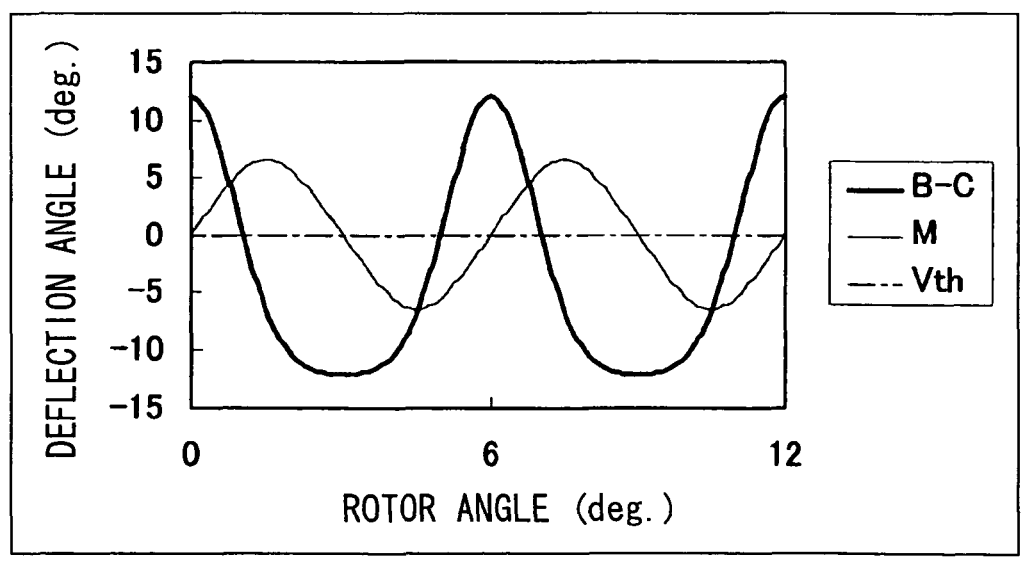
FIG. 12B is a diagram illustrating outputs of the operational amplifiers of FIG. 12A.

FIGS. 12A, 12B show a second comparison example in which two MRE bridges are specialized to detect the rotational direction of the rotor R. A sensor chip 100d of the second comparison example includes three MRE bridges 21, 23, 103. A sensor signal B outputted from the MRE bridge 21 is inputted to the non-inverting input (+) of the op-amp 41, and a sensor signal C outputted from the MRE bridge 23 is inputted to an inverting input (−) of the op-amp 41. A sensor signal M outputted from the MRE bridge 103 is inputted to the amplifier 47. Therefore, like the third embodiment, the third comparison example can detect both rotational position and direction of the rotor R. However, whereas the sensor chip 20d of the third embodiment uses two MRE bridges 21, 22, the sensor chip 100d of the third comparison example uses three MRE bridges 21, 23, 103. Therefore, the length (i.e., size) of the sensor chip 100d becomes larger than that of the sensor chip 20d.

The third embodiment can be summarized as follows. The op-amp 41 and the comparator 43 form a rotational position detection circuit. The rotational position detection circuit performs a differential operation on the sensor signals B, C and outputs a position signal Vm (Cm) indicating the rotational position of the rotor R. The amplifier 47, the comparator 44, and the signal processing circuit 48 form a rotational direction detection circuit. The rotational direction detection circuit outputs a direction signal Dd indicating the rotational direction of the rotor R based on the position signal Vm and the sensor signal C. In this way, the sensor signal C is inputted to each of the rotational position detection circuit and the rotational direction detection circuit. In other words, the MRE bridge 22 is shared among the rotational position detection circuit and the rotational direction detection circuit and used to detect not only rotational position but also rotational direction of the rotor R.

(Modifications)

The embodiments described above may be modified in various ways. For example, in the third embodiment, instead of the sensor signal C, the sensor signal B can be inputted to each of the op-amp 41 and the amplifier 47. The MRE bridges 21, 22 can be a Hall element.

Such changes and modifications are to be understood as being within the scope of the present invention as defined by the appended claims.

What is claimed is:

1. A rotation detection sensor for detecting a rotational direction of a rotating body having a gear with a tooth moving with rotation of the rotating body, the rotation detection sensor comprising:
    a magnet configured to produce a magnetic field directed to the tooth of the gear, the magnetic field varying with movement of the tooth;
    a plurality of magnetic sensors located between the gear and the magnet and aligned along an imaginary straight line perpendicular to a magnetic center axis of the magnet, the plurality of magnetic sensors outputting a plurality of sensor signals shifted in phase from each other, each sensor signal having a voltage or current value that changes depending on the magnetic field;
    a rotational position detection circuit configured to receive the sensor signals from the plurality of magnetic sensors, the rotational position detection circuit performing a differential operation on the received sensor signals to output a position signal indicating a rotational position of the rotating body, one of the plurality of magnetic sensors being defined as a shared magnetic sensor; and
    a rotational direction detection circuit configured to receive the sensor signal from the shared magnetic sensor and receive the position signal from the rotational position detection circuit, the rotational direction detection circuit outputting a direction signal, indicating a rotational direction of the rotating body, based on the position signal and the received sensor signal,
    wherein a distance between an imaginary center line and the shared magnetic sensor is equal to or less than a distance between the imaginary center line and each of the plurality of magnetic sensors other than the shared magnetic sensor, and
    wherein the imaginary center line connects a rotational center of the rotating body and the imaginary straight line in the shortest distance.

2. The rotation detection sensor according to claim 1, wherein the plurality of magnetic sensors other than the shared magnetic sensor are symmetrically arranged with respect to the imaginary center line.

3. A rotation detection sensor for detecting a rotational direction of a rotating body having a gear with a tooth moving with rotation of the rotating body, the rotation detection sensor comprising:
    a magnet configured to produce a magnetic field directed to the tooth of the gear, the magnetic field varying with movement of the tooth;
    a plurality of magnetic sensors located between the gear and the magnet and aligned along an imaginary straight line perpendicular to a magnetic center axis of the magnet, the plurality of magnetic sensors outputting a plurality of sensor signals shifted in phase from each other, each sensor signal having a voltage or current value that changes depending on the magnetic field;
    a rotational position detection circuit configured to receive the sensor signals from the plurality of magnetic sensors, the rotational position detection circuit performing a differential operation on the received sensor signals to output a position signal indicating a rotational position of the rotating body, one of the plurality of magnetic sensors being defined as a shared magnetic sensor; and
    a rotational direction detection circuit configured to receive the sensor signal from the shared magnetic sensor and receive the position signal from the rotational position detection circuit, the rotational direction detection circuit outputting a direction signal, indicating a rotational direction of the rotating body, based on the position signal and the received sensor signal,
    wherein a distance between an imaginary center line and the shared magnetic sensor is equal to or greater than a distance between the imaginary center line and each of the other magnetic sensors, and
    wherein the imaginary center line connects a rotational center of the rotating body and the imaginary straight line in the shortest distance.

4. The rotation detection sensor according to claim 3, wherein the other magnetic sensors are symmetrically arranged with respect to the imaginary center line.

5. A rotation detection sensor for detecting a rotational direction of a rotating body having a gear with a tooth moving with rotation of the rotating body, the rotation detection sensor comprising:
    a magnet configured to produce a magnetic field directed to the tooth of the gear, the magnetic field varying with movement of the tooth;
    a plurality of magnetic sensors located between the gear and the magnet and aligned along an imaginary straight line perpendicular to a magnetic center axis of the magnet, the plurality of magnetic sensors outputting a plurality of sensor signals shifted in phase from each other, each sensor signal having a voltage or current value that changes depending on the magnetic field;
    a rotational position detection circuit configured to receive a first subset of the sensor signals from a first subset of the plurality of magnetic sensors, the rotational position detection circuit performing a differential operation on the first subset of the sensor signals to output a position signal indicating a rotational position of the rotating body, one of the first subset of the plurality of magnetic sensors being defined as a shared magnetic sensor; and a rotational direction detection circuit configured to receive a second subset of the sensor signals from a second subset of the plurality of magnetic sensors, and the position signal, the rotational direction detection circuit outputting a direction signal based on the second subset of the sensor signals and the position signal, indicating a rotational direction of the rotating body, one of the second subset of the plurality of magnetic sensors being defined as the shared magnetic sensor, wherein a distance between an imaginary center line and the shared magnetic sensor is equal to or less than a distance between the imaginary center line and each of the other magnetic sensors, and wherein the imaginary center line connects a rotational center of the rotating body and the imaginary straight line in the shortest distance.

6. The rotation detection sensor according to claim 5, wherein the shared magnetic sensor is arranged on the imaginary center line, and wherein the plurality of magnetic sensors except for the shared magnetic sensor are symmetrically arranged with respect to the imaginary center line.

* * * * *